United States Patent Office 2,800,351
Patented July 23, 1957

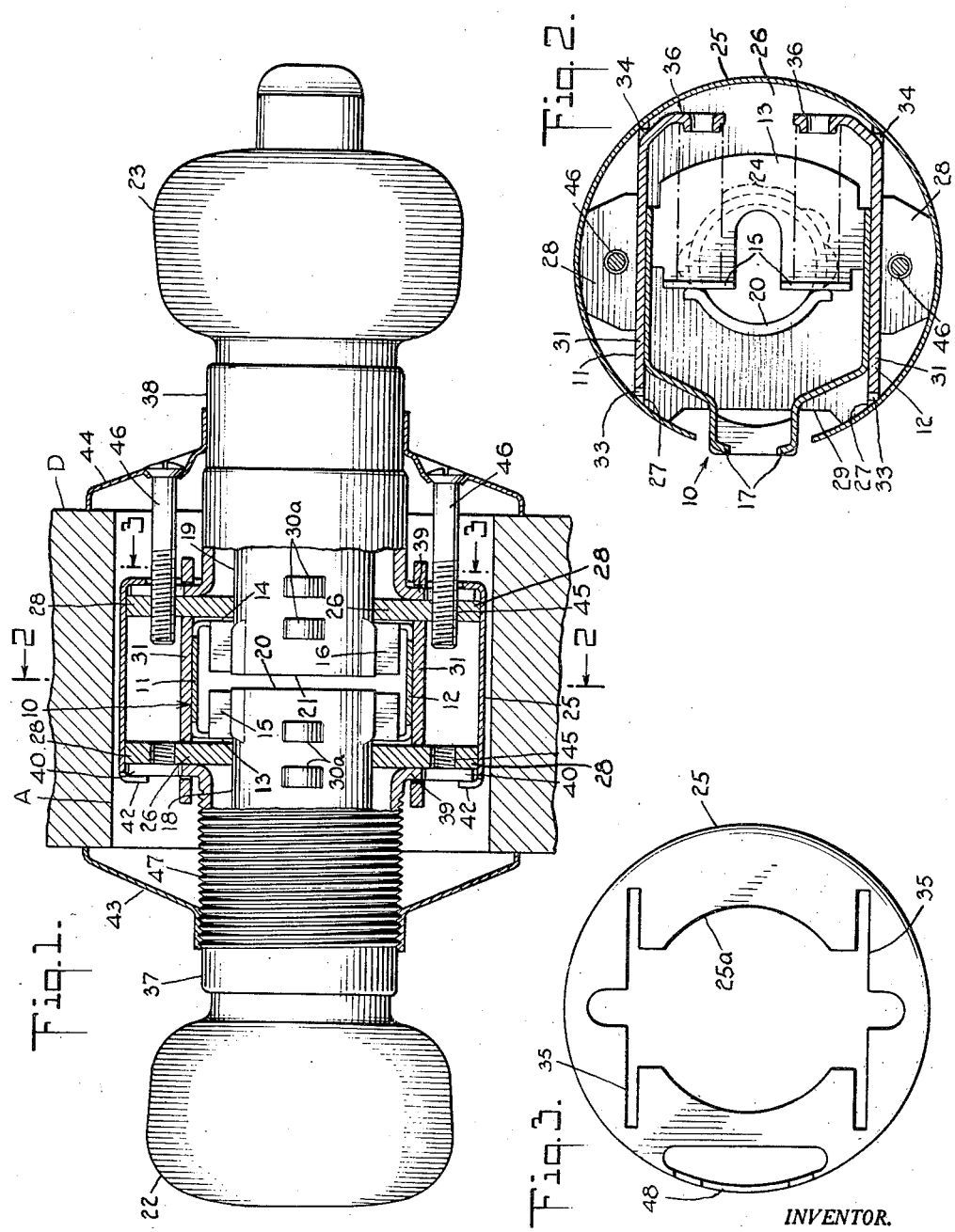

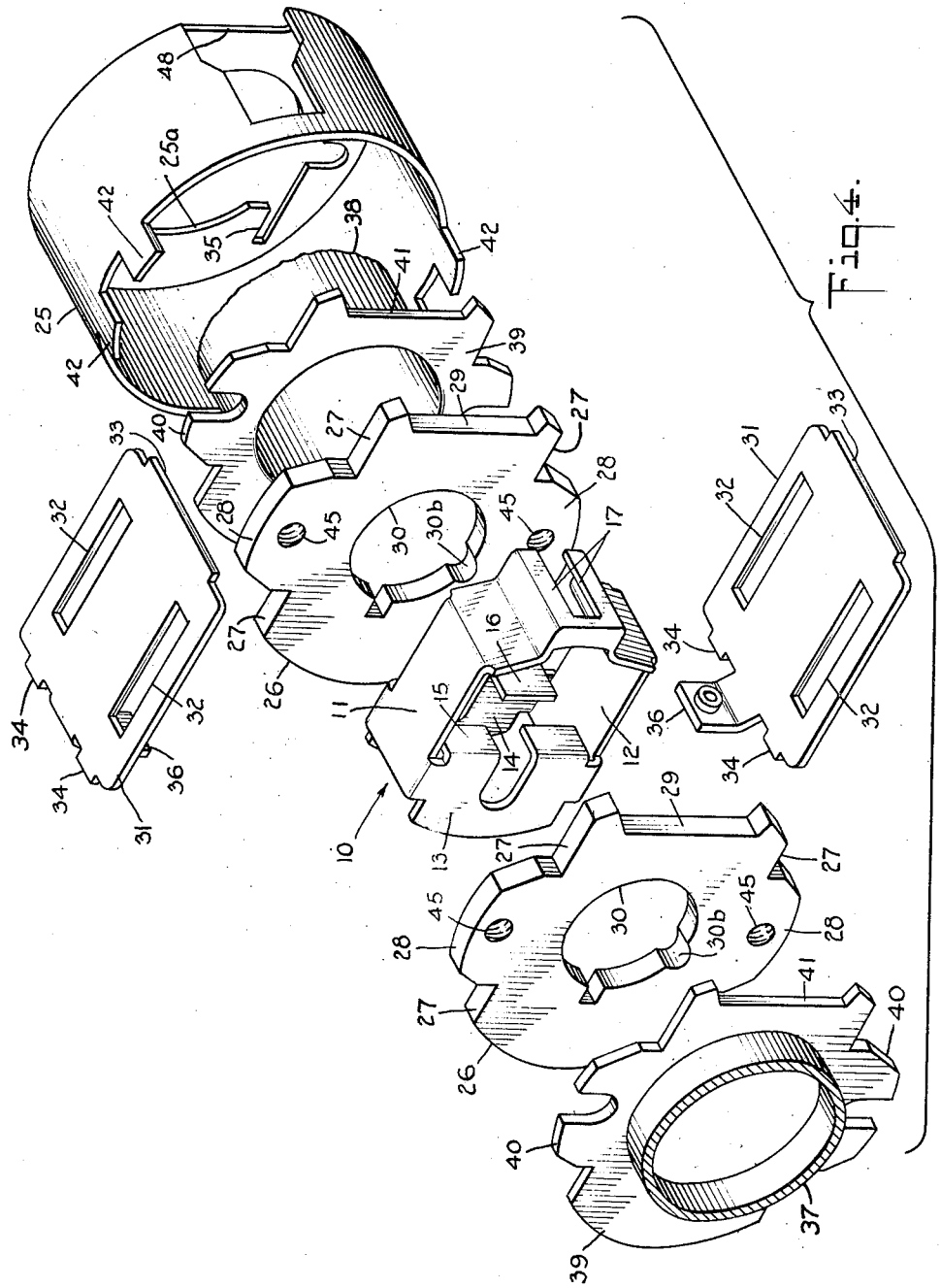

2,800,351

CYLINDRICAL LOCK CASE

Raymond W. Schmid, Havertown, Pa., assignor to The Yale & Towne Manufacturing Company, Stamford, Conn., a corporation of Connecticut Application February 8, 1955, Serial No. 486,869

3 Claims. (Cl. 292—337)

This invention relates to cylindrical locks, and more particularly to a cylindrical lock case.

Cylindrical lock cases present a very considerable problem in fabrication. Thus, they require the utilization of bearing sleeves and bearing plates, together with a retractor that must be held for movement in a particular path. As a feature of my invention, I contribute a cylindrical lock case that may be fabricated from simple parts and assembled so as to form a rigid casing. This assembly to form a rigid casing is effected through the relationship of the parts and the manner in which they are assembled to one another rather than through assembly means such as rivets, screws, bolts, welding or the like.

As a feature of my invention, I utilize a series of four interlocking plates that between them form four bearings for the retractor of my lock, the plates being interlocked relatively to one another, so that when encompassed by an outer housing that coacts with certain surfaces of the plates, the resulting assembly is rigid, even when subjected to the stresses of operation.

As a further feature of my invention, the bearing sleeves required in assemblies of the particular art, are assembled relatively to the four bearing plates just described, and are held together with those bearing plates by an outer housing. I am able to effect in this manner the complete assembly of the necessary bearing plates for forming the four way bearing for the retractor, together with the further assembly of the necessary bearing sleeves, all in an extremely simple and effective manner. Preferably, the only assembly means are lugs bent over into holding position and carried by the outer housing, all of the parts being otherwise held in assembled relation through portions that are readily moved without tools into assembled engagement with one another.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings:

Fig. 1 is a longitudinal section showing my novel lock case assembled in a cylindrical lock.

Fig. 2 is a cross-section on the line 2—2 of Fig. 1.

Fig. 3 is an end view of a part of the case taken on line 3—3 of Fig. 1.

Fig. 4 is an exploded view showing parts of the lock.

Referring now more particularly to Fig. 1 of the drawings, I show my novel cylindrical lock case constructed in a preferred form and utilized with a lock mechanism quite similar to that shown in the application of Daniel L. Biblin, Serial No. 314,704, filed October 14, 1952, now Patent No. 2,751,243. This lock mechanism includes a bolt retractor 10 that has a generally rectangular shape with top, bottom, and side walls, 11, 12, 13, 14, on which the retractor slides in the lock case. The bolt retractor 10 has vertical flanges 15, 16 extending inwardly from its opposed side walls 13, 14, and has at its front end opposed parts 17, best shown in Figs. 2 and 4, that are adapted to interlock with a latch bolt, as in the above-mentioned Biblin application. Retractor tubes 18, 19, Fig. 1, rotate on opposed sides of the lock case, these tubes having at their inner ends cam portions 20, 21 that coact with the vertical flanges 15, 16 on the retractor. Knobs 22, 23 are attached to the outer ends of the retractor tubes 18, 19 for rotating the tubes. Each tube when rotated acts through its cam portion 20 or 21 to slide the bolt retractor 10 rearwardly in the lock case, thus retracting the latch bolt, as will be understood. I indicate in Fig. 2 springs 24 that are engaged between parts of the lock case and the retractor flanges 15, 16, to press the retractor 10 forwardly toward a position corresponding to the thrown position of the latch bolt. Further details of the lock operating mechanism are not important to an understanding of my invention. It is necessary to realize principally that, in locks of this class, the lock case holds the bolt retractor for movement in a linear path, while holding the retractor tubes for rotation in a particular axis.

In the extremely novel lock case that I contribute by my invention, I utilize as the outer part of the case a cup-like member 25 that is adapted to be inserted in the opening A in the door D, as shown in Fig. 1. I utilize also a pair of base plates 26 that are formed with a generally circular outline, as best seen in Figs. 2 and 4, whereby to fit vertically within the cup-like member 25. These base plates 26 act as bearings for the opposed sides 13, 14 of the bolt retractor 10, as will be described in due course. Portions of each base plate 26 are cut away within their circular outline to form upper and lower pairs of horizontal seating surfaces 27, with these seating surfaces spaced to leave upper and lower lugs 28. Each base plate is cut away also at its front edge to form a clearance notch 29. The base plates 26 when assembled support the inner ends of the retractor tubes 18, 19 for rotation, and for the particular purpose each plate 26 has a central bearing opening 30. It may be observed here that I show on each retractor tube 18, 19, a pair of lugs 30a, Fig. 1, that are adapted to lie at opposed sides of a base plate 26 to hold the tube assembled to the plate. A notch 30b in each bearing opening 30, Fig. 4, permits one of the lugs 30a to move past the plate 26 in a particular rotated position so that the retractor tube can be assembled to the plate.

I utilize in addition a pair of upper and lower assembly plates 31 that coact in a very novel way with the base plates 26 and cup-like member 25. These assembly plates 31 are formed with parallel slots 32, best seen in Fig. 4, and are adapted to lie against the seating surfaces 27 on base plates 26, as in Figs. 1 and 2, with the base plate lugs 28 positioned in the slots 32. Further, each assembly plate 31 has parallel front and rear edges 33, 34 that I prefer to form on shallow lugs on the main portion of the plate. These edges 33, 34 are arranged particularly to lie in juxtaposed relation to the inner surface of the cup-like member 25 when the base plates 26 and assembly plates 31 together are inserted in the member 25, as in Fig. 2. Through this arrangement, it is possible for the cup-like member 25 to hold the assembly plates 31 against the seating surfaces 27 and, therefore, in spaced parallel relation to one another. It may be observed at this point that I form on the rear edge of each assembly plate 31 an angular flange 36 that acts as a seat for one of the retractor springs 24.

As further means for holding the assembly plates 31, I form the end wall of the cup-like member 25 with horizontal slots 35, best seen in Fig. 3, these slots being so arranged as to receive an edge portion of each assembly plate 31. Through this arrangement, the cup-like member 25 can hold the base plates 26 and assembly plates 31 not only in assembled relation to one another, but also against rotation relatively to the cup-like member 25.

I equip my novel lock case with a pair of bearing sleeves 37, 38 for supporting the outer ends of the retractor tubes 18, 19. Each of these bearing sleeves 37 and 38 is formed at its inner end with a flange 39, this flange having a shape substantially like that of the base plates 26. Thus, each of the sleeve flanges 39 has top and bottom lugs 40, and a notch 41 at its front side. When assembled, each bearing sleeve 37, 38 is positioned with its flange 39 against the outer surface of a base plate 26, and with its lugs 40 inserted together with the lugs 28 on the base plates into the slots 32 in the assembly plates 31. The bearing sleeve 38 extends outwardly through an opening 25a in the end of the cup-like member 25, and the flange 39 on this sleeve is then seated against the inner surface of the member 25, as well shown in Fig. 1. The opposed end of cup-like member 25 has a series of lugs 42, Fig. 4, that are adapted to be bent inwardly against the flange 39 on the bearing sleeve 37, as in Fig. 1. When the bearing sleeves 37, 38, base plates 26, and assembly plates 31 are thus assembled in the cup-like member 25 between the lugs 42 and the end wall of cup-like member 25, these sleeves and plates form with the cup-like member an extremely rigid lock case. The inner surfaces of the base plates 26 and assembly plates 31 then form a rigid bearing for the four sides of the bolt retractor 10, and hold the retractor for linear sliding on the lock case.

To enable the lock case to be assembled to a latchbolt in the door, as is usual in locks of the particular class, I form the front portion of the cup-like member 25 with an opening 48 extending through a part of the end wall of the member, as well shown in Fig. 4. This opening 48 is aligned relatively to the notches 29 and 41 in the plates 26 and bearing sleeve flanges 39, so that the latchbolt and the front end parts 17 on retractor 10 can move into interlocking relation with one another.

Conventional roses are carried by rose supports 43, 44 and for simplifying the showing, these are eliminated from the drawings. The rose supports are also conventional. Rose support 43 is at the outer side of the door and is mounted on the outside bearing sleeve 37 through screw threads 47 that enable this rose support to be adjusted in an axial direction on the lock case. To assemble the inside rose support 44 to the lock case, I utilize screws 46, that are engaged in threaded openings 45 in the upper and lower lugs 28 on one of the bearing plates 26.

I believe that those persons skilled in the art will now understand the construction and the particular advantages of the extremely novel cylindrical lock case that I contribute by my invention. My novel lock case is very simple and easy to assemble, and does not require for its assembly riveted or welded parts or screws. Merely through the utilization of interlocking parts, I am able to provide an extremely rigid lock case that has a four-way bearing for the bolt retractor, and that holds the retractor tubes firmly in properly aligned relation to the bolt retractor. I believe, therefore, that the very considerable value of my invention will be fully appreciated.

I now claim:

1. In a combination of the class described, a pair of base plates, upper and lower assembly plates, said upper and lower assembly plates formed with slots for the entry of parts of both said base plates whereby said assembly plates when moved against the base plates are assembled in predetermined spaced parallel relation and hold said base plates in predetermined spaced relation, said plates by their assembly adapted for housing a sliding retractor that slides between the inner surfaces of said base plates and also between the inner surfaces of said upper and lower assembly plates, a pair of retractor tubes, opposed bearing sleeves on which the retractor tubes rotate, said bearing sleeves having each a flange adapted to lie against the outer surface of a base plate, lugs on each of said flanges lying in juxtaposed relation to the parts of said base plates and entering said slots with said parts whereby to assemble said bearing sleeves to said base plates and assembly plates, a member fitted about and encompassing said flanges and plates, and means holding said member assembled to said bearing sleeves and plates.

2. In a lock of the class described, a pair of base plates, each base plate formed on upper and lower edges thereof with lugs and seating surfaces juxtaposed to said lugs, upper and lower assembly plates, opposed edge portions on each upper and lower assembly plate formed with closed slots for corresponding lugs on the upper and lower edges of both base plates, said slots accepting the lugs through movement of the assembly plates in opposed directions toward the seating surfaces on the upper and lower edges of both base plates, a member acting against both assembly plates to hold said plates in seated position on the seating surfaces of the base plates with said opposed edge portions of the assembly plates encompassing the base plate lugs, and said member by so holding the assembly plates securing those plates in predetermined spaced parallel relation for housing a sliding retractor between the base plates and assembly plates.

3. In a lock of the class described, a pair of base plates, each base plate formed on upper and lower edges thereof with lugs and seating surfaces juxtaposed to said lugs, each base plate having a bearing opening for the inner end of a retractor tube, opposed bearing sleeves for supporting the outer ends of the retractor tubes, a flange on each bearing sleeve adapted to lie against a side of a base plate, lugs formed on each of said flanges to lie against the lugs of the corresponding base plate in aligned relation thereto, upper and lower assembly plates, opposed edge portions on each upper and lower assembly plate formed with closed slots, said slots accepting the base plate lugs and bearing sleeve lugs through movement of the assembly plates in opposed directions toward the seating surfaces on the upper and lower edges of both base plates, a member acting against both assembly plates to hold said plates in seated position on the seating surfaces of the base plates with each of said assembly plate edge portions encompassing a base plate lug and a bearing sleeve lug, and said member by so holding the assembly plates rigidly securing the bearing sleeves and base plates in predetermined relation to one another and to the assembly plates.

References Cited in the file of this patent

UNITED STATES PATENTS

| | | |
|---|---|---|
| 1,719,282 | Wilson | July 2, 1929 |
| 2,297,077 | Schlage | Sept. 29, 1942 |
| 2,751,243 | Biblin | June 19, 1956 |